United States Patent [19]

Ivie

[11] Patent Number: 5,229,348
[45] Date of Patent: * Jul. 20, 1993

[54] ANIMAL LITTER GRANULES AND METHOD OF PROCESSING PEANUT HULLS IN PRODUCING CAT LITTER

[75] Inventor: Stephen L. Ivie, Ashburn, Ga.

[73] Assignee: Bio-Plus, Inc., Ashburn, Ga.

[*] Notice: The portion of the term of this patent subsequent to Aug. 20, 2008 has been disclaimed.

[21] Appl. No.: 954,696

[22] Filed: Sep. 29, 1992

Related U.S. Application Data

[63] Continuation of Ser. No. 729,608, Jul. 15, 1991, abandoned, which is a continuation-in-part of Ser. No. 488,170, Mar. 5, 1990, Pat. No. 5,041,410.

[51] Int. Cl.⁵ .............................. B01J 20/28
[52] U.S. Cl. .................... 502/401; 119/171; 119/172; 119/173
[58] Field of Search ............... 502/401; 119/171, 172, 119/173

[56] References Cited

U.S. PATENT DOCUMENTS

| | | | |
|---|---|---|---|
| 2,168,532 | 8/1937 | McMath et al. | 99/2 |
| 3,059,615 | 1/1959 | Kuceski et al. | 119/1 |
| 3,286,691 | 11/1966 | McFadden | 119/1 |
| 3,921,581 | 11/1975 | Brewer | 119/1 |
| 3,941,090 | 3/1976 | Fry | 119/1 |
| 3,983,842 | 3/1975 | Marion et al. | 119/1 |
| 4,529,407 | 7/1985 | Johnston et al. | 440/21 |
| 4,561,860 | 12/1985 | Gulley et al. | 440/10 R |
| 4,607,594 | 8/1986 | Thacker | 119/1 |
| 4,621,011 | 11/1986 | Fleisher | 428/221 |
| 4,821,677 | 4/1989 | Harrison | 119/1 |

OTHER PUBLICATIONS

Peanut Hulls: Their Properties and Potential Uses, by W. J. Albrecht, Agricultural Reviews and Manuals, U.S. Department of Agriculture, Southern Series, No. 1, Jan. 1979.

*Primary Examiner*—W. J. Shine
*Attorney, Agent, or Firm*—Hopkins & Thomas

[57] ABSTRACT

Peanut hulls are processed into dust free granules suitable for use as chemical carriers and moisture absorbent materials, including cat litter, by being pulverized to a powder. Deodorizer, scent and mold inhibitor powders are added to the peanut hulls powder. The powders are compacted into compacted masses which are then crumbled into granules. The powder is then compacted into compact masses that are divided into granules and screened.

47 Claims, No Drawings

ANIMAL LITTER GRANULES AND METHOD OF PROCESSING PEANUT HULLS IN PRODUCING CAT LITTER

REFERENCE TO RELATED APPLICATION

This is a continuation of copending application Ser. No. 07/729,608 filed on Jul. 15, 1991, now abandoned which is a continuation-in-part of application Ser. No. 488,170 filed Mar. 5, 1990, now U.S. Pat. No. 5,041,410.

TECHNICAL FIELD

This invention relates to methods of processing peanut hulls into forms suitable for use as chemical carriers and as moisture absorbent materials, including cat litter.

BACKGROUND OF THE INVENTION

Commercial peanut shelling operations today create large quantities of peanut hulls. Since the sale of the hulls has not usually proven to be profitable, a percentage of shells have normally been disposed of, as by incineration, which produces air borne pollutants that degrade the atmosphere, or by dumping with its problems of continuous accumulations.

There are some situations where peanut hulls are sold on a limited basis as an economical by-product of the shelling operation rather than discarded or processed as waste. Heretofore, these have primarily been limited to the use of peanut hulls for litter, as filler in artificial fireplace logs, and as cattle feed roughage. These limited usages however place demand far below shell availability.

It has also been known that peanut hulls have the potential for profitable commercial use in other applications. This is attributable to their chemical inertness property which renders them suitable as carriers for pesticides and fertilizers. Their high liquid absorbing property also renders them potentially suitable for use in a number of industrial processes as moisture absorbent agents.

Attempts at transforming peanut hulls into masses of size and weight suitable for use as chemical, i.e. pesticide and fertilizer carriers and absorbent agents have been beset with problems. Foremost among these has been the creation of dust as the hulls are reconfigured as by milling and pelletizing. The resulting granules have also been too light in weight for these targeted usages, and have had variable moisture levels.

SUMMARY OF THE INVENTION

In a preferred form of the invention, a method has now been discovered for processing peanut hulls into substantially dust free granules that are suitable for use as pesticide and fertilizer carriers and as moisture absorbent materials. The method comprises the steps of pulverizing the peanut hulls to a powder as by milling them through a screen having interstices no greater than 3/32 inch which size limitation has been discovered to be of critical importance. Preferably they are milled through a 1/16 inch screen. After the peanut hulls have been pulverized the powder is compacted into highly compact, dense masses of a size greater than the size of the end product. If desired the compaction sheets or pellets are dried to limit their moisture level. The compacted masses are divided into granules as by being crumbled, flaked or chipped. Finally, the crumbles are screened into selected granule sizes.

In another preferred form of the invention, a method has now been discovered for processing peanut hulls into substantially dust free granules suitable for use as cat litter. The method comprises the steps of pulverizing the peanut hulls to a powder and adding an additive in powdered form to the peanut hulls powder. The additive powders preferably include deodorizers and mold inhibitors. The peanut hulls and additive powders are compacted into compacted masses which are then crumbled into cat litter granules.

DETAILED DESCRIPTION

Essentially the new process transforms the weight, density, shape, size, moisture level and structural integrity of peanut hulls into granules that are suitable for use as carriers of chemical agents and as moisture absorbent materials for use in various industrial processes. After an initial grinding, that is conventionally done at the commercial sheller, the peanut hulls are further ground or milled through a screen preferably having 1/16 inch interstices. A 300 to 350 HP, full cycle hammermill (or two 150 HP hammermills), are preferably used. This causes the hulls to be ground into powder, the term "powder" herein referring to hull material passed through a screen having screen openings no greater than 3/32 inch. It is critically important that the screen interstices be no more than 3/32 inch. Screen openings any larger than that, such as even as small as ⅛ inch, have been found to be ruinous of the process in that the final product is entirely too dusty, flaky and light in weight for extensive commercial use.

The peanut hull powder is next compacted by being pelletized or compacted into compaction sheets. Where the hulls are compacted a compactor produced by Prater Industries of Chicago, Ill. has been found to work satisfactorily in producing 48 inch long compaction sheets 4 to 8 inches wide. Where the hulls are pelletized a large 300 HP pellet mill has been found to work well that produces pellets of a 5/16 inch diameter and approximately ⅜ inch long size. The compaction is to such a high degree that the pellets have a pour weight of between 36 and 42 pounds per cubic foot with 38–40 pounds per cubic feet being preferred. If required for a specific end use, the compaction sheets or pellets are dried to limit this moisture level such as to approximately 7% or less by weight.

Following the compaction step the compacted masses, in the form of pellets or compaction sheets, are divided and broken up into granules. A slowly driven large crumble roll or Prater flaker has been found to create granules of good consistency. Conversely, hammermilling has been found to be too violent. The compaction of the powder is such that the weight of the end product granules is between some 26 and 30 pounds per cubic foot, with 27 to 29 pounds being preferred and 28 pounds per cubic foot being ideal. With less compaction the end product is too light. Compaction sheets may be broken up by rotating steel finger tips with the Prater compactor.

Finally the granules are separated as by the use of shaker screens which divides and separates the granules into selected sizes. This is done sufficiently slow to remove approximately 2% or less of residual dust content and preferably less than 1%. For use as carriers of pesticides, i.e. insecticides, herbicides, fungicides and rodenticides the granules should be generally round, granular shaped and not flat. Ninety-nine percent of the end product should pass through a 14 gauge screen and not pass through a 40 gauge screen.

Again it is emphasized that it is critical for the peanut hulls to be ground or milled to powder size for this enables the material to be compacted into sufficiently dense masses. Compaction should be such as to produce a pour weight of at least 36 pounds per cubic foot for 5/16 diameter by ¾ inch long cylindrical pellets. Without this degree of density the dust content and product weight has been found to be unsuitable for the above mentioned commercial applications.

Animal litter, particularly cat litter, may be produced by the just described process with the addition of powders added to the peanut hull powder prior to compaction. These additives powders are mold inhibitors, and deodorizers such as those available from Alltech, Inc. of Nickolasville, Ky. If desired, scent may also be added in powdered or liquid spray form to the peanut hulls powder before compaction. These additive powders are mixed with the peanut hulls powder by a microfeeder which preferably meters one pound of deodorizer and six pounds of mold inhibitor powders for every ton of peanut hulls powder. The peanut hulls and additive powders are compacted into compacted masses in the form of compaction sheets or pellets having a pour weight of at least 36 pounds per cubic foot. Once the compactions are broken into granules, most of the cat litter granules should pass through a 6 gauge screen and not pass through a 16 gauge screen. Following the step of breaking the compactions into granules, the above process also may include the step of screening the granules with the shaker screens to remove those granules which pass through a 16 gauge screen and those granules which do not pass through a 6 gauge screen.

Though preferred forms of the invention have been described in detail, it should be understood that numerous modifications may be, in addition to those expressly recited, may be made thereto without departure from the spirit and scope of the invention as set forth in the following claims.

I claim:

1. A method of processing peanut hulls into substantially dust free granules suitable for use as cat litter, and with the method comprising the steps of:
   (a) pulverizing the peanut hulls to a powder,
   (b) adding an additive in powdered form to the peanut hulls powder,
   (c) compacting the peanut hulls and additive powders into compacted masses, and
   (d) crumbling the compacted masses into granules.

2. The method of claim 1 wherein step (d) the compacted masses are crumbled rolled.

3. The method of claim 1 wherein step (b) a deodorizer additive in powdered form is added to the peanut hulls powder.

4. The method of claim 1 wherein step (b) a scent additive in powdered form is added to the peanut hulls powder.

5. The method of claim 1 wherein step (b) a mold inhibitor in powdered form is added to the peanut hulls powder.

6. The method of claim 1 further comprising the step of
   (e) screening the granules to remove those that pass through a 16 gauge screen and those that do not pass through a 6 gauge screen.

7. A method of processing cat litter comprising the steps of:
   (a) pulverizing peanut hulls to a powder by milling the hulls through a substantially 1/16 inch size screen,
   (b) adding a powdered additive the peanut hulls powder,
   (c) compacting the peanut hulls and additive powders into compacted masses in the form of compaction sheets or pellets having a pour weight of at least 36 pounds per cubic foot,
   (d) crumble rolling the compacted masses into granules, and
   (e) reducing the residual dust content of the granules by shaking the granules on shaker screens.

8. The method of claim 7 wherein step (b) a deodorizer powder is added to the peanut hulls powder.

9. The method of claim 7 wherein step (b) a scent powder is added to the peanut hulls powder.

10. The method of claim 9 wherein step (b) a mold inhibitor powder is added to the peanut hulls powder.

11. The method of claim 7 further comprising the step of drying the granules to a moisture level of less than 7% by weight.

12. The method of claim 7 which consists essentially of the recited steps.

13. The method of claim 7 wherein step (e) the shaker screens remove granules that pass through a 16 gauge screen and those that do not pass through a 6 gauge screen.

14. A method of processing peanut hulls into granules suitable for use as cat litter, comprising the steps of:
   (a) pulverizing the peanut hulls to a powder,
   (b) adding an additive selected from the group consisting of a mold inhibitor, a deodorizer, a scent, and mixtures thereof to the peanut hulls powder,
   (c) compacting the peanut hulls powder and additive into compacted masses, and
   (d) crumbling the compacted masses into granules.

15. The method of claim 14, further comprising the step of (e) screening the granules.

16. The method of claim 15, wherein the screening of the granules reduces the residual dust content to approximately 2% or less.

17. The method of claim 14, further comprising the step of (f) controlling the moisture level of the granules so that the granules have a moisture level of approximately 7% or less by weight.

18. A method of producing cat litter, comprising the steps of:
   (a) milling peanut hulls through a screen defining openings of approximately 1/16 inch to produce a peanut hulls powder,
   (b) adding an additive to the peanut hulls powder,
   (c) compacting the peanut hulls powder and additive into compacted masses,
   (d) crumble rolling the compacted masses into granules, and
   (e) shaking the granules on shaker screens.

19. The method of claim 18, wherein said additive in step (b) comprises a deodorizer.

20. The method of claim 18, wherein said additive in step (b) comprises a scent.

21. The method of claim 18, wherein said additive in step (b) comprises a mold inhibitor.

22. The method of claim 18, wherein the shaking of the granules on shake screens reduces the residual dust content to approximately 2% or less.

23. The method of claim 18, further comprising the step of (f) controlling the moisture level of the granules so that the granules have a moisture level of approximately 7% or less by weight.

24. Animal litter granules, consisting essentially of peanut hulls and a mold inhibitor, said animal litter granules being formed by milling the peanut hulls to a powder, adding a mold inhibitor to the powder to form a mixture composed of the powder and the mold inhibitor, compacting the mixture into a compacted mass, and crumbling the compacted mass into granules.

25. The animal litter granules of claim 24, wherein most of said granules will pass through a 6 gauge screen but will not pass through a 16 gauge screen.

26. The animal litter granules of claim 24, further comprising an additive selected from a group consisting of a deodorizer, a scent and mixtures thereof.

27. The animal litter granules of claim 24, having a maximum dust content of approximately 2%.

28. The animal litter granules of claim 24, said granules having a moisture level of approximately 7% by weight.

29. The animal litter granules of claim 28, having a maximum dust content of approximately 2%.

30. The animal litter granules of claim 29, wherein most of said granules will pass through a 6 gauge screen but will not pass through a 16 gauge screen.

31. Animal litter granules, consisting essentially of peanut hulls and a deodorizer, said animal litter granules formed by milling the peanut hulls to a powder, adding a deodorizer to the powder to form a mixture composed of the powder and the deodorizer, compacting the mixture into a compacted mass, and crumbling the compacted mass into granules.

32. The animal litter granules of claim 31, wherein most of said granules will pass through a 6 gauge screen but will not pass through a 16 gauge screen.

33. The animal litter granules of claim 31, having a maximum dust content of approximately 2%.

34. The animal litter granules of claim 31, said granules having a moisture level of approximately 7% by weight.

35. The animal litter granules of claim 34, having a maximum dust content of approximately 2%.

36. The animal litter granules of claim 35, wherein most of said granules will pass through a 6 gauge screen but will not pass through a 16 gauge screen.

37. Animal litter granules, consisting essentially of peanut hulls, a mold inhibitor and a deodorizer, said animal litter granules formed by milling the peanut hulls to a powder, adding a mold inhibitor and a deodorizer to the powder to form a mixture composed of the powder, the mold inhibitor and the deodorizer, compacting the mixture into a compacted mass, and crumbling the compacted mass into granules.

38. The animal litter granules of claim 37, wherein mos of said granules will pass through a 6 gauge screen but will not pass through a 16 gauge screen.

39. The animal litter granules of claim 37, having a maximum dust content of approximately 2%.

40. The animal litter granules o claim 37, said granules having a moisture level of approximately 7% by weight.

41. The animal litter granules of claim 40, having a maximum dust content of approximately 2%.

42. The animal litter granules of claim 41, wherein most of said granules will pass through a 6 gauge screen but will not pass through a 16 gauge screen.

43. The method of claim 1, further comprising the step of
   (e) screening the granules.

44. The method of claim 43, wherein the screening of the granules reduces the residual dust content to approximately 2% or less.

45. The method of claim 1, further comprising the step of (f) controlling the moisture level of the granules so that the granules have a moisture level of approximately 7% or less by weigh.

46. The method of claim 7, wherein the shaking of the granules on shaker screens reduces the residual dust content of the granules to approximately 2% or less.

47. The method of claim 7, further comprising the step of (f) controlling the moisture level of the granules so that the granules have a moisture level of approximately 7% or less by weight.

* * * * *

UNITED STATES PATENT AND TRADEMARK OFFICE
CERTIFICATE OF CORRECTION

PATENT NO. : 5,229,348

DATED : July 20, 1993

INVENTOR(S) : Stephen L. Ivie

It is certified that error appears in the above-identified patent and that said Letters Patent is hereby corrected as shown below:

On the cover page, section [57] Abstract, delete the fourth sentence.

Column 2, line 46, change "this" to --their--.

Column 3, claim 2, after "wherein" insert --in--.

Column 3, claim 3, after "wherein" insert --in--.

Column 3, claim 4, after "wherein" insert --in--.

Column 3, claim 5, after "wherein" insert --in--.

Column 4, claim 8, after "wherein" insert --in--.

Column 4, claim 9, after "wherein" insert --in--.

Column 4, claim 10, after "wherein" insert --in--.

Column 4, claim 13, after "wherein" insert --in--.

Column 4, claim 17, change "14" to --15--.

Column 4, claim 22, change "shake" to --shaker--.

UNITED STATES PATENT AND TRADEMARK OFFICE
CERTIFICATE OF CORRECTION

PATENT NO. : 5,229,348
DATED : July 20, 1993
INVENTOR(S) : Stephen L. Ivie It is certified that error appears in the above-identified patent and that said Letters Patent is hereby corrected as shown below:

Column 6, claim 38, change "mos" to --most--.

Column 6, claim 40, change "o" to --of--.

Signed and Sealed this

Thirty-first Day of May, 1994

Attest:

BRUCE LEHMAN

Attesting Officer    Commissioner of Patents and Trademarks